United States Patent [19]
Marcuse et al.

[11] Patent Number: 5,790,720
[45] Date of Patent: Aug. 4, 1998

[54] ACOUSTIC-OPTIC SILICA OPTICAL CIRCUIT SWITCH

[75] Inventors: Dietrich Marcuse, Lincroft; Herman Melvin Presby, Highland Park, both of N.J.

[73] Assignee: Lucent Technologies, Inc., Murray Hill, N.J.

[21] Appl. No.: 852,205

[22] Filed: May 6, 1997

[51] Int. Cl.$^6$ ................................................ G02F 1/335
[52] U.S. Cl. .................... 385/7; 385/11; 385/16; 385/20; 385/22
[58] Field of Search ................ 385/7, 9, 11, 16, 385/20, 22, 30, 31, 40, 41, 8, 15, 17, 18, 19, 23

[56] References Cited

U.S. PATENT DOCUMENTS

| | | | |
|---|---|---|---|
| 5,542,009 | 7/1996 | Kuehnle | 385/7 |
| 5,677,971 | 10/1997 | Okayama et al. | 385/11 |
| 5,689,362 | 11/1997 | Kadota | 385/7 X |

OTHER PUBLICATIONS

C.H. Henry et al., "Glass Waveguide on Silicon for Hybrid Optical Packaging", 7 *J. Lightwave Technol.*, pp. 1530–1539 (1989), No Month.

M. Kawachi, "Silica Waveguides on Silicon and Their Application to Integrated–Optic Components", 22 *Optical and Quantum Electronics*, pp. 391–416 (1990), No Month.

D.P. Morgan, Surface–Wave Devices for Signal Processing, ch. 1, pp. 1–14, (Elsevier Science Pub. Co., N.Y., 1985), No Month.

D. Marcuse, Light Transmission Optics, ch. 8, p. 327 (Van Nostrand Reinhold Co., N.Y., 1992), No Month.

T.A. Birks, et al. "2×2 Single–mode fiber routing switch", Optics Letters, vol. 21, No. 10, pp. 722–724, (1996), No Month.

H. Sabert, et al. "Versatile acousto–optical flexural wave–modulator, filter and frequency shifter in dual–core fibre", *International Journal of Optoelectronics*, vol. 7, No. 2, pp. 189–194 (1992), No Month.

D.A. Smith, et al., "Evolution of the Acousto–Optic Wavelength Routing Switch", Journal of Lightwave Technology, vol. 14, No. 6, pp. 1005–1019, (1996), No Month.

*Primary Examiner*—Phan T. H. Palmer
*Attorney, Agent, or Firm*—Robert E. Rudnick

[57] ABSTRACT

An acousto-optic silica optical circuit switch that selectively routes signals to one of two outputs includes a surface-acoustic-wave source and a coupler waveguide structure formed within silica glass. The waveguide structure includes a single mode input section connected to a multimode section connected to first and second single mode output sections. The first output section has a structure capable of accepting power from an optical signal propagating in a first transmission mode of the multimode section, and the second output section has a structure capable of accepting power from an optical signal propagating in a second transmission mode in said multimode section. In operation, RF excitation is selectively provided to the SAW source to selectively cause coupling of the first and second transmission modes in the multimode section. As a consequence, an optical signal launched in the input section propagates through the multimode section to the first output section in the first transmission mode of the waveguide structure, or alternatively, such launched optical signal is coupled to the second transmission mode in the multimode section such that its power is transferred to the second transmission mode to propagate into the second output section.

23 Claims, 4 Drawing Sheets

ACOUSTIC-OPTIC SILICA OPTICAL CIRCUIT SWITCH

FIELD OF THE INVENTION

The invention relates to switching devices for optical signals.

BACKGROUND OF THE INVENTION

Optical transmission and processing systems are being implemented for use in various communication applications. For example, telephone and data transmission systems are now in use that utilize optical fibers to transmit voice and data as optical or light signals over long distances. In such systems, routing switches connect input and output optical fibers based on an electrical control signal to route optical signals over a desired path within the system. Such routing switches provide, for example, an optical communication link along a particular path or to bypass an out-of-service segment.

Switches having multiple inputs and outputs are often formed from array configurations of smaller 1×2 and/or 2×2 switch elements. As a result, it has become increasing more desirable for such switches to be implemented as integrated optical circuits having reduced size, low manufacturing cost and relatively low power requirements for performing routing and switching. Integrated optical circuits enable multiple optical components to be formed on a common substrate having compact dimensions in a similar manner to the formation of numerous electronic devices on a conventional integrated circuit chip. Exemplary integrated optical devices are silica optical circuits employing integrated glass waveguide structures within silica glass (SiO$_2$) formed on silicon substrates. The basic structure of such devices is described in C. H. Henry et al., "Glass Waveguides on Silicon for Hybrid Optical Packaging", 7 *J. Lightwave Technol.*, pp. 1530–1539 (1989), which is herein incorporated by reference.

Conventional integrated silica optical circuit switches include thermo-optic switches. An exemplary thermo-optic switch configuration is described in M. Kawachi, "Silica Waveguides on Silicon and Their Application To Integrated-Optic Components", 22 *Optical and Quantum Electronics*, pp. 391–416 (1990). This optical switch uses a Mach-Zehnder interferometer configuration having first and second directional couplers buried within silica glass. Two waveguide arms also buried within the silica glass connect respective outputs of the first coupler to inputs of the second coupler. Chromium heater strips are deposited on the surface of the top cladding above the waveguide arms.

In operation, a light signal launched into one input of the first coupler is split with portions of the signal transmitted through each waveguide arm to the second coupler. The second coupler recombines the light signal portions and directs the recombined light signal to a particular output of that coupler. When power is applied to a particular heater strip, the respective waveguide arm is heated which decreases its refractive index and correspondingly decreases the effective length of the light path through that waveguide arm. This decrease in the light path's effective length produces a sufficient phase difference between light signals entering the second coupler to cause destructive interference in the recombined light signal routing it to the other output of the second coupler. However, since thermo-optic switches require heating of buried waveguides, such switches generally have undesirably large power requirements and relatively long response times.

2

Accordingly, a switch configuration with enhanced switching times and reduced power requirements is desirable.

SUMMARY OF THE INVENTION

The invention is directed to a silica optical circuit switch having a waveguide configuration of compact dimensions that facilities optical signal routing using an acousto-optic effect. In particular, the invention is based on the realization that a particular acoustic wave type, the surface acoustic wave or Rayleigh wave, is capable of providing sufficient acoustic wave energy to a buried multimode waveguide to cause a sufficient periodic change in the refractive index to couple light energy between two transmission modes of the waveguide. As a consequence, power of an optical signal propagating in an even transmission mode is transferred to a next higher, odd transmission mode due to the periodic refractive index change caused by the surface acoustic wave. This realized behavior is employed by the invention to produce a corresponding optical signal switch.

A silica optical circuit switch in accordance with the invention includes a surface acoustic wave (SAW) source and a coupler waveguide structure formed within silica glass. The waveguide structure includes an input section connected to a multimode section connected to first and second output sections. The input section has a structure in which an optical signal can propagate in an even or symmetrical transmission mode. The multimode section has a structure in which an optical signal can propagate in the even transmission mode as well as a higher odd or asymmetrical transmission mode. The first output section has a structure for accepting an optical signal propagating in the even transmission mode of the multimode section and not the odd transmission. In contrast, the second output section has a structure for accepting an optical signal propagating in the odd transmission mode of the multimode section and not the even transmission mode.

In operation, when no surface acoustic wave is generated, the coupler waveguide structure enables propagation of an optical signal from the input section through the multimode section to the first output section in the even transmission mode. However, when the SAW source directs a surface acoustic wave at a particular phase matching angle θ to the multimode waveguide section, an optical signal launched into the input section is coupled from the first transmission mode to the second transmission mode in the multimode section such that its power is transferred to the second transmission mode. The optical signal in this second transmission mode is then accepted into the second output section. As a result, the structure of the invention enables a silica optical circuit switch to have advantageously compact dimensions, rapid switching times and relatively low power requirement for routing optical signals.

Additional features and advantages of the invention will become more readily apparent from the following detailed description and accompanying drawings.

DETAILED DESCRIPTION

The invention relies on surface acoustic waves for providing sufficient acoustic wave energy to a multimode section of a silica optical circuit waveguide for causing a desirable periodic change in its refractive index to couple power of an optical signal propagating in a first transmission mode to a second transmission mode. Such a multimode waveguide section is useable with corresponding first and second single mode output waveguide sections having different structures for accepting optical signals in the first and second transmission mode, respectively, from the multimode waveguide section.

Thus, in a switch according to the invention, when no surface acoustic wave is generated, an optical signal launched in the multimode section in the first transmission mode propagates to the first output section substantially in the first transmission mode. However, when a surface acoustic wave is directed at the multimode section, power of an optical signal launched in the first transmission mode is coupled to the second transmission mode in the multimode section producing an optical signal that propagates into the second output section due to adiabatic mode transfer. Accordingly, a surface acoustic wave can be selectively generated to provide a desired routing of optical signals through the waveguide structure.

A surface acoustic wave, also referred to as a Rayleigh wave, is a particular type of acoustic wave. A surface acoustic wave or Rayleigh wave, is an acoustic wave that is guided along a plane surface of a material with its amplitude decaying exponentially with depth into the material. An acoustic wave is an elastic nonelectromagnetic wave having a frequency typically in the range from below one hertz up to tens of gigahertz. An acoustic wave can be propagated in a medium having inertia and elasticity (the existence of forces which tend to restore any part of a medium to its original position), and in which displaced particles transfer momentum to adjoining particles and are themselves restored to their original position. However, in a surface acoustic wave, approximately 90% of the wave's energy propagates within a depth from the plane surface corresponding to one wavelength of the acoustic wave. Surface acoustic waves are described in greater detail in D. P. Morgan, *Surface-Wave Devices for Signal Processing*, (Elsevier Science Pub. Co., N.Y., 1985)(Surface-Wave Device reference), which is incorporated by reference herein.

Since silica optical circuit structures include optical waveguides formed relatively near a plane surface of the structures and since 90% of the energy of a surface acoustic wave propagates within one acoustical wavelength of the plane surface, it is possible to select a surface acoustic wave wavelength that enables the use of a multimode waveguide section of advantageously short length for providing the optical signal routing switch of the invention. Numerous silica optical switch configurations are useable for performing optical signal routing according to the invention. Several exemplary configurations are depicted in the figures and described below for illustration purposes only and not meant to be a limitation of the invention. An exemplary 1×2 silica optical circuit switch 1 in accordance with the invention is depicted in FIG. 1.

Figure 1:
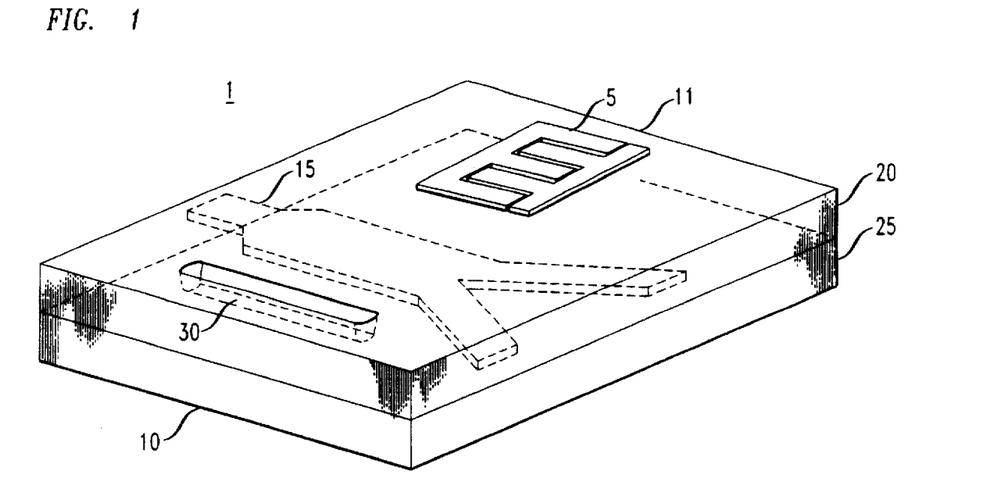
FIG. 1 illustrates a perspective view of a silica optical circuit switch in accordance with a first embodiment of the invention.

In FIG. 1, the switch 1 includes a surface acoustic wave (SAW) source 5 positioned on a surface 11 of a silica optical structure 10 containing an exemplary planar waveguide structure 15 in accordance with a first embodiment of the invention. The planar waveguide 15 is located within silica glass 20 formed on a substrate 25 of the silica optical structure 10. The SAW source 5 is positioned relative to the waveguide structure such that generated surface acoustic waves are directed at a particular phase matching angle relative to a multimode section of the waveguide structure to produce a corresponding transmission mode coupling as described in greater detail below with regard to FIG. 2. Also, an optional acoustic wave damper 30, such as a trench 35 containing an acoustic energy absorbing material 40, is shown within the structure to reduce acoustic wave reflections that would be directed at the waveguide 15 at other than the desired phase matching angle.

An exemplary fabrication process for the silica optical structure 10 is as follows: a base layer of silica glass is deposited on the substrate 25, such as a silicon substrate using, for example, low pressure vapor chemical deposition or flame hydrolysis; and then a thin core layer of doped silica glass is deposited on this silica glass layer; the core layer is then configured to the desired structure of the waveguide 15 using standard lithographic techniques, such as lithography, etching; and a layer of doped silica glass is then deposited over the core layer to act as a top cladding. A suitable doping profile for the doped silica glass is uniform step-index distribution. While the proceeding description relates to silica on silicon waveguide devices, it should be understood that it is possible to fabricate the circuit on other substrate materials including fused quartz, ceramic or III-V materials, such as InP or GaAs.

The silica glass top cladding and the base layer of silica glass form the silica glass 20. Suitable thicknesses for the base silica layer, core layer and top cladding layer are 10 to 20 μm, 4 to 8 μm and 0 to 20 μm, respectively. Thicknesses less than 10 μm for the base silica layer are undesirable because of light loss to the substrate while thickness greater than 20 μm are generally disadvantageous because of long deposition times required to form such thicknesses. For a detailed discussion of glass waveguides on silicon and the fabrication thereof, see, for example, C. H. Henry et al., "Glass Waveguides on Silicon for Hybrid Optical Packaging", 7 *J Lightwave Technol.*, pp. 1530–1539 (1989), which is incorporated by reference herein.

The particular type of device or arrangement used for the SAW source 5 in producing surface acoustic waves in the silica optical structure 10 is not critical to practicing the invention. Exemplary devices for the SAW source 5 include conventional interdigital transducers and other ZnO transducer configurations which are described in, for example, the previously cited *Surface-Wave Device* reference.

Figure 2:
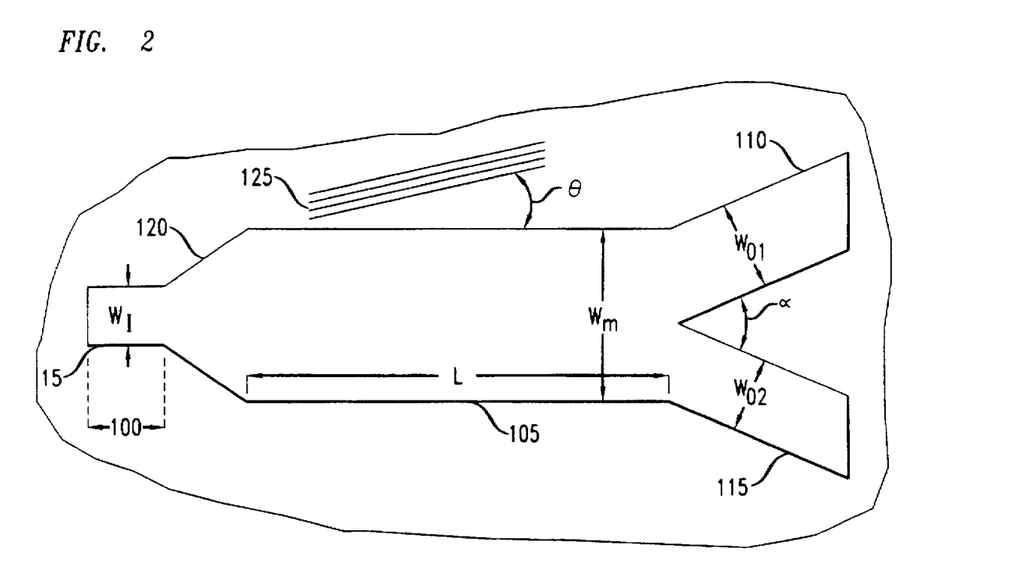
FIG. 2 illustrates a top view of a waveguide structure employed in the silica optical circuit switch of FIG. 1.

A top view of the planar waveguide structure 15 in the silica optical structure 10 is shown in FIG. 2. The source 5 and optional damper 30 of FIG. 1 have not been shown in FIG. 2 for ease of illustration. Referring to FIG. 2, the planar waveguide structure 15 includes an input section 100, a multimode section 105, and first and second output sections 110 and 115, respectively. The input section 100 is a single mode section capable of propagating an optical signal in an even transmission mode. The multimode section 105 can propagate an optical signal in this even transmission mode as well as in a next higher, odd transmission mode.

The first and second output sections 110 and 115 are single mode sections capable of propagating optical signals in even transmission modes. However, the first output section 110 accepts power of an optical signal propagating substantially in the even transmission mode within the multimode section 105 and not the odd transmission node of the section 105. In a corresponding manner, the second output section 115 accepts power of an optical signal substantially propagating in the odd transmission mode within the multimode section 105 and not the even transmission mode. The first and second output sections 110 and 115 extend from the section 105 at a separation angle $\alpha$.

Phase fronts of a surface acoustic wave generated by the SAW source 5 of FIG. 1 are represented by reference number 125 and are at a particular phase matching angle $\theta$ relative to the multimode section 105 in order to provide a particular condition of a periodic refractive index change in the multimode section 105. Such phase matching achieves the desired coupling of power of optical signals between the first and second transmission modes. Moreover, the multimode section 105 has an interaction length L over which a surface acoustic wave provides such condition.

The number of transmission modes a waveguide section can propagate is determinable from the waveguides normalized frequency parameter which is commonly referred to as the V-number of the section. The V-number is based on the signal wavelength to be propagated, cross-sectional area of the waveguide section and the relative refractive index difference between the waveguide section and the surrounding silica glass. A common expression for the V-number follows and is described in greater detail in D. Marcuse, *Light Transmission Optics*, ch. 8, p. 327 (Van Nostrand Reinhold Co., N.Y., 1992), which is incorporated by reference herein.

$$V = \frac{2\Pi}{\lambda} a \sqrt{n_1^2 - n_2^2} ,$$

where $\lambda$ is the wavelength of an optical signal, the value $\alpha$ is the width of the particular waveguide section and the values $n_1$ and $n_2$ are the refractive indexes of the previously described core and cladding layers, respectively. Exemplary refractive index values for the silica core and cladding layers $n_1$ and $n_2$ are 1.48 and 1.46, respectively.

Accordingly, a particular cross-sectional area of the multimode waveguide section 105 and/or the relative refractive index difference between the waveguide section 105 and the surrounding silica glass 20 is employed such that the section 105 can propagate optical signals in a first, even transmission mode as well as a second, next higher odd transmission mode. Further, the particular cross-sectional area of the waveguide 15 and the relative refractive index difference between the waveguide 15 and/or the surrounding silica glass 20 is employed for the input and output waveguide sections 100, 110 and 115 such that they are capable of propagating an optical signal over a broad bandwidth in an even transmission mode. However, the particular cross-sectional areas and/or the relative refractive index differences are chosen for the output waveguide sections 110 and 115 to enable power of an optical signal propagating substantially in the even transmission mode to enter the first output waveguide section 110 and not the second output section 115 and power of an optical signal propagating substantially in the odd transmission mode to enter the second output waveguide section 115 and not the first output section 110.

For instance, exemplary single mode waveguide structures for the waveguide sections 100, 110 and 115 having a width in the range of 5 µm and a height in the range of 4 µm to 8 µm as well as a common refractive index $\Delta$ that is 0.64% of the refractive index of the surrounding silica glass 20 can propagate optical signals having wavelengths in the range of, for example, 1.25 µm to 1.6 µm in symmetrical or asymmetrical transmission modes. Moreover, an exemplary multimode structure for the waveguide section 105 having a width in the range of 17.0 µm and a height in the range in the range of 4 µm to 8 µm as well as a common refractive index $\Delta$ of 0.64% of the surrounding silica glass 20 can likewise propagate optical signals having wavelengths in the range of, for example, 1.25 µm to 1.6 µm.

A waveguide structure of a substantially constant height across its sections as depicted in FIG. 1 can be formed at relatively low cost employing the previously described fabrication techniques. Also, fabricating the waveguide sections with a substantially constant relative index of refraction can likewise be performed at relatively low cost employing conventional techniques. As a consequence, a variation in waveguide width can produce the corresponding single mode and multimode waveguide sections as shown in FIGS. 1 and 2.

Thus, it is possible for the depicted single mode input and first output waveguide sections 100 and 110 to have widths $W_1$ and $W_{O1}$ that are substantially identical for transmitting an optical signal in an even transmission mode that is less than a width $W_M$ of the multimode waveguide section 105. Likewise, the single mode second output waveguide section 115 has a width $W_{O2}$ suitable for accepting optical signals propagated in the second transmission mode within the multimode section 105. The width $W_{O2}$ is generally less than the width $W_{O1}$. Further, power of an optical signal propagating in the odd transmission mode in the multimode section 105 is substantially converted to a corresponding even transmission mode at the transition between sections 105 and 115 due to adiabatic mode transfer to enable continuing propagation of such signal power in the second output section 115. Exemplary widths for the output waveguide sections 110 and 115 as well as angle separations between the such output sections to achieve the desired behavior are described below with regard to FIGS. 4 and 5.

A substantially adiabatically tapered section 120 of the waveguide structure 15 in FIG. 2 provides a transition between the input waveguide section 100 and the multimode section 105 to enable an optical signal launched in the first transmission mode in the input section 100 to substantially continue propagating in that mode in the multimode section 105. Such adiabatic transitions can be of a conventional design. For instance, it is advantageous for the length of a conventional adiabatic transition in the direction of the waveguide structure 15 to be approximately between 10 and 100 times the length of the wavelength conveyed in a propagated optical signal. It should be readily understood that although the depicted waveguide 5 has a rectangular cross-sectional area, various other waveguide cross-sectional areas such as, for example, oval or circular, can be employed in accordance with the invention.

In operation, when no acoustic signals are generated, an optical signal launched in the input waveguide section 100 continues to propagate in the even transmission mode through the tapered section 120 and multimode section 105 into the first output waveguide section 110. Little or no power of such an optical signal propagates into the second output waveguide section 115. As a result, the optical signal is routed to the first waveguide output section 110 of FIG. 2.

However, when a surface acoustic wave generated by the SAW source 5 of FIG. 1 propagates through the multimode section 105 at the particular relative phase matching angle θ, a periodic change occurs in the effective refractive index over the interaction length L of the multimode section 105. Such periodic refractive index change causes coupling of the respective even and odd transmission modes within the multimode section 105. As a consequence, power of an optical signal propagating into the multimode section 105 in the even transmission mode from the input section 100 is substantially transferred to the odd transmission mode to produce an optical signal that propagates into the second output section 115. Little or no power of such an optical signal propagates into the first output waveguide section 110.

Thus, it is possible to route an optical signal launched in the input waveguide section 100 to the first output section 110 by disconnecting RF excitation to the SAW source 5 of FIG. 1. In the alternative, it is possible to route an optical signal launched in the input waveguide section 100 to the second output section 115 by providing RF excitation to the SAW source 5 of FIG. 1. Since approximately 90% of the energy of a surface acoustic wave remains within a distance of one acoustic wave wavelength, it is advantageously possible to provide sufficient acoustic wave energy to optical waveguides within silica optical circuits typically contained within 14 μm to 28 μm of the structure surface 11 of FIG. 1 with acoustical frequencies in the range of 45 MHz to 90 MHz without requiring long interaction lengths for the multimode section 105 or high power requirements for the SAW source 5.

Coupling of power between even and odd transmission modes of the multimode section 105 is produced when the relative angle θ of the generated surface acoustic waves to the multimode section 105 is such that a phase matching condition occurs between transmission modes. For example, it is possible to determine the required angle θ according to the following expression:

$$\sin\theta = \frac{\beta_e - \beta_o}{K},$$

$$K = \frac{2\pi f_a}{v_a}$$

wherein values $\beta_e$ and $\beta_o$ are the propagation constants of the even and odd modes for the multimode waveguide section 105, respectively, and wherein the value $v_a$ is surface acoustic wave velocity—approximately 3400 m/sec in silica glass, and the value $f_a$ is the surface acoustic wave frequency. Accordingly, the angle θ of the surface acoustic waves relative to the multimode section 105 is further based on the selected frequency for the surface acoustic waves.

Moreover, the extent of the optical signal power that is transferred between the coupled even and odd transmission modes is based on the change in the refractive index caused by the surface acoustic wave as well as the length of the multimode section 105 in which such refractive index change occurs. A change in refractive index of the multimode section 105 of approximately $2\times10^{-5}$ to $6\times10^{-5}$ is achievable according to the invention using a SAW source 5 providing acoustic energy having a frequency in the range of 25 MHz to 1 GHz on the order of 1 W per centimeter of multimode section 105. Further, it is typically possible to couple between approximately 90% and 100% of the power of an optical signal to the second transmission mode using a SAW source 5 producing an surface acoustic wave energy in the approximate range of 0.4 W to 2.0 W over a multimode section length L as short as 2 to 6 cm at an acoustical frequency of 200 MHz.

Figure 3:
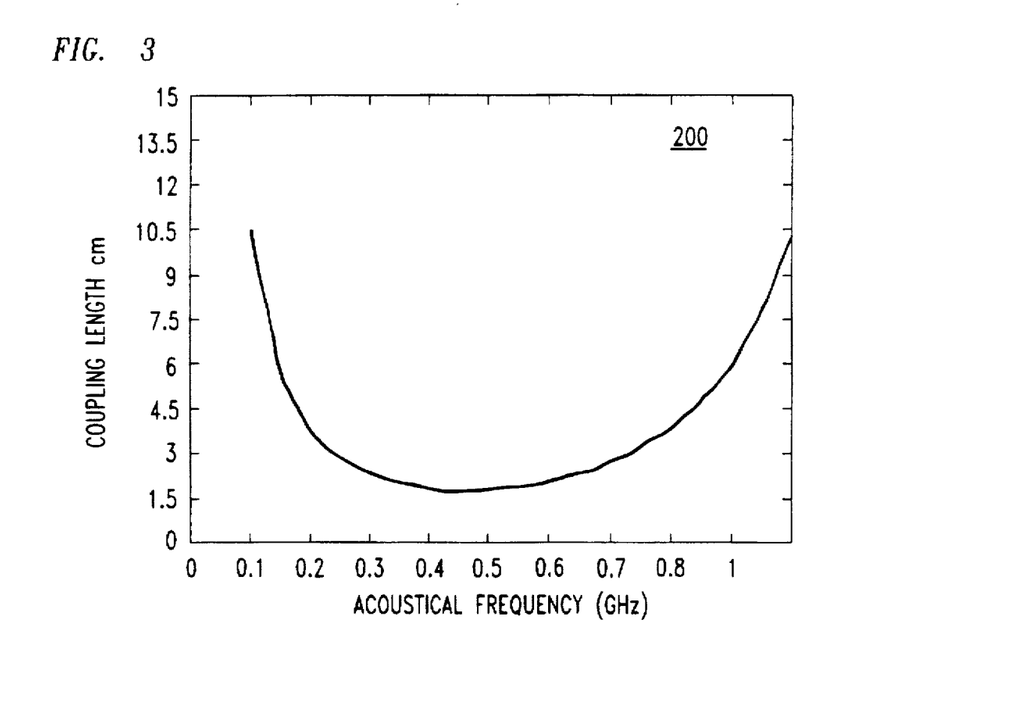
FIG. 3 illustrates a graph representing a relationship between particular surface acoustic wave frequencies and required lengths of a section of the waveguide structure of FIGS. 1 and 2, to achieve optical signal routing for an exemplary waveguide configuration according to the invention.

A graph 200 illustrated in FIG. 3 depicts the relationship of surface acoustic wave frequency to the interaction length L of the multimode section 105 of FIG. 2 to achieve a complete transfer of light signal power from the even transmission mode to the next higher, odd transmission mode. The switch characterized by the graph 200 employs a multimode waveguide section 105 having an approximate width and height of 5 μm and 2 μm, respectively, and a refractive index of about 1.5 relative to a refractive index of approximately 1.46 for the surrounding silica glass cladding 20, shown in FIG. 1. Further, the switch characterized by the graph 200 includes a SAW source 5 providing an acoustical power of approximately 1.0 W per centimeter over the length L of the multimode waveguide section 105. The graph 200 illustrates that it is possible to employ an interaction length on the order of 2.0 cm to 5.0 cm to achieve a full exchange of light signal power between transmission modes with a surface acoustic wave frequency in the range of approximately 100 to 900 MHz.

Referring again to FIG. 2, the first and second output waveguide sections 110 and 115 extend from the multimode section 105 at a relative separation angle α. The particular relative angle a used as well as the differences in corresponding cross-sectional areas of and/or relative refractive indexes to the surrounding silica glass 20 of the output waveguides 110 and 115 further facilitate acceptance of optical signal power propagating in the even or odd transmission mode into the first or second output waveguide sections 110 or 115, respectively. Since the depicted exemplary first and second output waveguide sections 110 and 115 have the same relative refractive index and a common waveguide height, the employed section widths $W_{O1}$ and $W_{O2}$ in conjunction with the relative angle α facilitate such acceptance of optical signal power into the respective sections 110 and 115.

Figure 4:
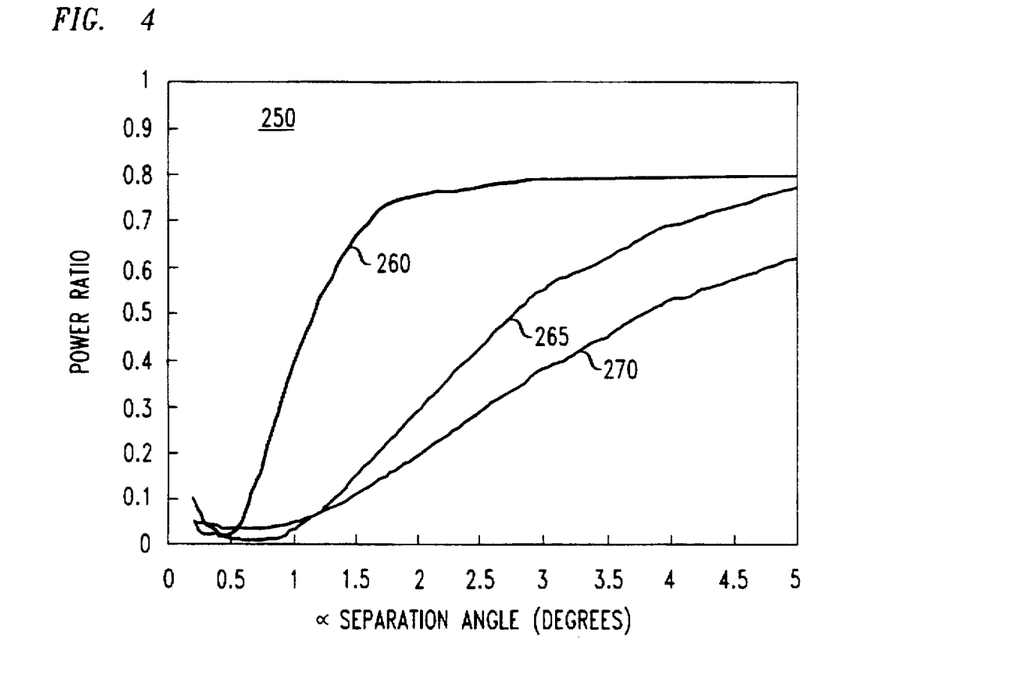
FIG. 4 illustrates a graph representing power ratios of optical signal power propagating into respective output waveguide sections of FIGS. 1 and 2 caused by exemplary different widths of such sections as well as different separation angles between such sections.

FIG. 4 depicts a graph 250 containing exemplary curves 260, 265 and 270 representing the optical signal power expected to propagate into the respective first and second sections 110 and 115 in the presence of a surface acoustic wave based on a particular separation angle α and three different ratios of the waveguide section widths $W_{O1}$ and $W_{O2}$. In FIG. 4, portions $P_1$ and $P_2$ of an optical signal propagating in the multimode section 105 with a power P continue propagating into the respective output waveguide sections 110 and 115 are represented as a ratio of powers $P_1/P_2$. The three curves 260, 265 and 270 are shown for exemplary width ratios $W_{O1}/W_{O2}$ of 1.2, 1.5 and 2.0, respectively. The three curves 260, 265 and 270 are further based on a multimode section width $W_M$ of 5.5 μm and a corresponding combined width $W_{O1}+W_{O2}$ of 5.5 μm. However, it is alternatively possible for the combined width $W_{O1}+W_{O2}$ to be larger or smaller than the multimode section width $W_M$ to provide the desired adiabatic mode transfer for signal routing according to the invention.

In FIG. 4, the depicted curve 260 illustrates that the use of a first output section width $W_{O1}$ that is 20% larger the second waveguide section width $W_{O2}$ enables the use of a separation angle α of approximately 0.5° and 0.6° to achieve a corresponding routing of approximately 98% and 90% of the power of an optical signal to the second waveguide output section 115. Further, the depicted curve 265 illustrates that the use of a relatively larger first output section width $W_{O1}$ that is 50% larger the second waveguide section width $W_{O2}$ enables the use of a separation angle $\alpha$ of approximately 1.0° and 1.3° to achieve a corresponding routing of approximately 98% and 90% of the optical signal power to the second waveguide output section 115. However, the curve 270 illustrates that the use of an even larger first output section width $W_{O1}$ that is 100% larger the second waveguide section width $W_{O2}$, surprisingly, only enables the use of a separation angle $\alpha$ of approximately 0.5° and 1.5° to achieve a corresponding routing of approximately 98% and 90% of the optical signal power to the second waveguide output section 115.

Accordingly, the graph 250 reveals that generally the use of larger differences between output waveguide section widths facilitates the use of larger values for the separation angle $\alpha$ for directing at least 90% of optical signal power to the second output waveguide section 115, up to approximately a width ratio $W_{O1}/W_{O2}$ of 1.5. However, larger width ratios $W_{O1}/W_{O2}$ do not provide such dramatic increases in the allowable separation angle $\alpha$ over the ratio $W_{O1}/W_{O2}$ of 1.5. Thus, to achieve a power split of an optical signal of greater than 90% to the second waveguide output section 115, it is desirable to use a width ratio $W_{O1}/W_{O2}$ of 1.5 and a separation angle less than 1.5°.

Further, it is advantageous to maintain a length $L_O$ for the output waveguide sections 110 and 115 of at least four times the combined widths $W_{O1}+W_{O2}$ of such waveguide sections at the separation angle to achieve the desired adiabatic mode transfer between the multimode section 105 and the output sections 110 and 115 of FIG. 2. The length of four times the combined widths $W_{O1}+W_{O2}$ of the output waveguide sections 110 and 115 to achieve the desired adiabatic transitions is provided for illustration purposes only based on relative refractive indexes of 1.48 and 1.46 of the waveguide structure 15 and surrounding silica glass 20, respectively. However, it is alternatively possible to employ shorter lengths $L_O$ of the output sections 110 and 115 if the waveguide structure 15 had a larger refractive index relative to the surrounding silica glass.

Figure 5:
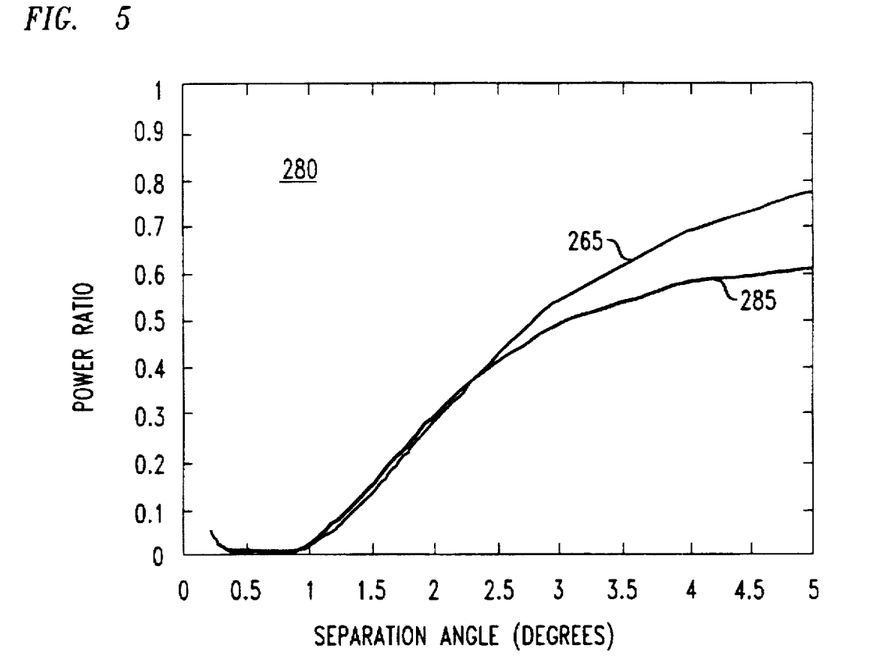
FIG. 5 illustrates a graph representing power ratios of optical signal power propagating into respective output waveguide sections of FIGS. 1 and 2 caused by the absence or presence of RF excitation to the SAW generator.

The curves 260, 265 and 270 depict the power ratio's $P_1/P_2$ when a surface acoustic wave is generated to direct power of optical signals into the second output waveguide 115 of FIG. 2 for illustration purposes only. Similar alternate power ratio's $P_2/P_1$ are likewise achievable with a separation angle $\alpha$ of approximately less than 3.0° to direct power of optical signals propagating in the even transmission mode of the multimode section 105 into the first output waveguide section 110 if no surface acoustic wave is generated. FIG. 5 illustrates a graph 280 comparing the power ratio $P_1/P_2$ curve 265, also shown in FIG. 4, for the output sections width ratio $W_{O1}/W_{O2}$ of 1.5. Also, shown in the graph 280 is a curve 285 for the corresponding power ratio $P_2/P_1$ for an optical signal routed from the multimode section 105 to the first output waveguide section 110. As shown in the graph 280, the respective power ratios are approximately equal for separation angles of less than about 3.0°.

Referring back to FIG. 1, the optional damper 30 absorbs and/or dampens acoustic wave energy to provide an impediment to reflection of such acoustic energy back at the waveguide structure 15. It is possible that such acoustic wave reflections would propagate through the multimode section 105 at angles other than the desired phase matching angle $\theta$ causing a degradation in the desired coupling performance. Such reflections can occur at the edges and other surfaces of the silica optical structure 10, or other components formed within the silica glass 20. The particular configuration used for the damper 30 is not critical to practicing the invention. Accordingly, the damper 30 including the trench 35 containing the acoustic energy absorbing material 40 is for illustration purposes only. An exemplary acoustic energy absorbing material is, for example, conventional epoxy.

Moreover, it is advantageous to position such a damper 30 such that the waveguide structure 15 is located between the SAW source 5 and the damper 30 to allow generated surface acoustic waves to propagate into and thorough the waveguide structure 15. Also, it is possible for a damper according to the invention to be an acoustic energy absorbing material, such as epoxy, formed on edge surfaces of the silica optical structure 10 as well as on the surface 11 to prevent acoustic wave reflections at such surfaces. Other exemplary damper configurations useable according to the invention include other adhesives such as silicone. It is also possible to provide an acousto-optic switch according to the invention without the damper 30 of FIG. 1.

Figure 6:
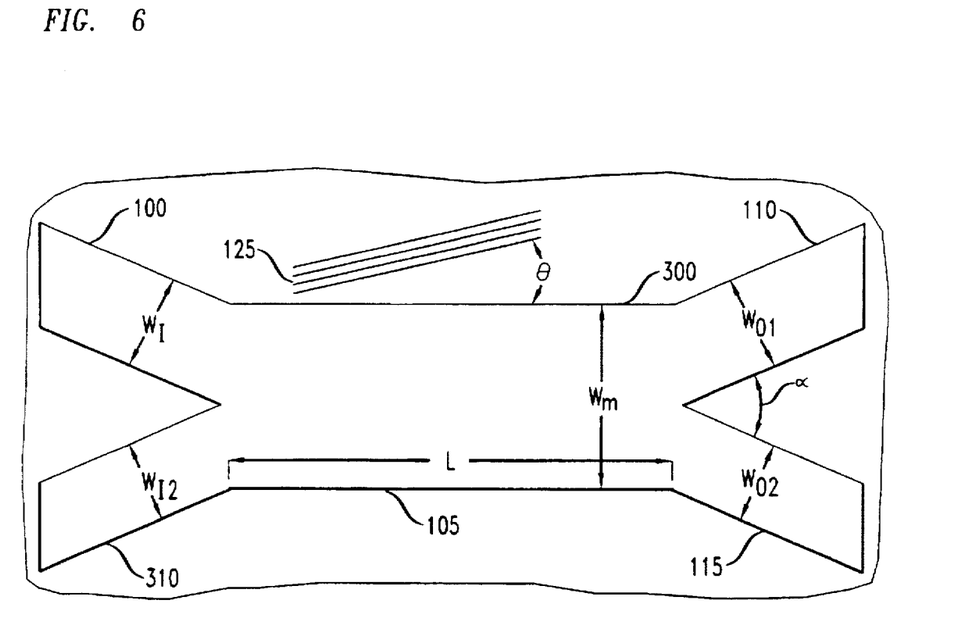
FIG. 6 illustrates a top view of an alternative waveguide structure than that shown in FIG. 2 for use in a silica optical circuit switch in accordance with a second embodiment of the invention.

The exemplary switch configuration depicted in FIGS. 1 and 2 have a waveguide structure 15 for a 1×2 switch for illustration purposes only. It is further possible to provide waveguide structures according to the invention for a 2×2 switch in a similar manner. A top view of an exemplary waveguide structure 300 for a 2×2 acousto-opto silica optical circuit switch according to the invention is shown in FIG. 6. Similar components in FIGS. 2 and 6 are like numbered for clarity including, for example, the multimode waveguide section 105 and output waveguide sections 110 and 115. Also, the input waveguide section 100 is referred to as first input waveguide section 100 with regard to FIG. 6. The SAW source as well as an optional damper used in conjunction with the structure 300 have not been shown for ease of illustration.

The waveguide structure 300 includes the first input waveguide section 100, multimode section 105 and first and second output waveguide sections 110 and 115 as in the waveguide structure 15 of FIG. 2. However, the waveguide structure 300 further includes a second input waveguide section 310. The second input waveguide section 310 has a structure to enable optical signals launched in this section to continue propagating in the multimode section 105 in the second transmission mode due to adiabatic mode transfer. Accordingly, it is possible for such a second input waveguide section to have a width $W_{12}$ corresponding to the width $W_{O2}$ of the second output section 15.

In operation, if no surface acoustic wave is generated, then an optical signal launched in the first input waveguide section 100 propagates through the multimode section 105 in the first transmission mode to exit the first output waveguide section 110 as in the waveguide structure 15 of FIG. 2. In a similar manner, an optical signal launched in the second input waveguide section 310 propagates through the multimode section 105 in the second transmission mode to exit the second output waveguide section 115. However, when a surface acoustic wave is generated, a launched signal in either of the first or second waveguide sections 100 or 310 couples to the respective other transmission mode in the multimode section 105 to exit the second or first output waveguide section 115 or 110, respectively.

Accordingly, the structure 300 operates as a 2×2 optical signal routing switch wherein optical signals are routed from the first input section 100 to either the first or second output sections 110 and 115 by connecting or disconnecting RF excitation to the corresponding SAW source. Likewise, optical signals are be routed from the second input section 310 to either the second or first output sections 115 and 110 in an identical manner. Although FIG. 6 illustrates the structure 300 depicts the first and second input sections 100 and 310 at particular relative positions relative to the output waveguide sections 110 and 115, it is alternately possible to interchange the positions of such input waveguide sections 100 and 310, such that the second input section 310 would appear above the first input section 100 in the FIG. 6.

Figure 7:
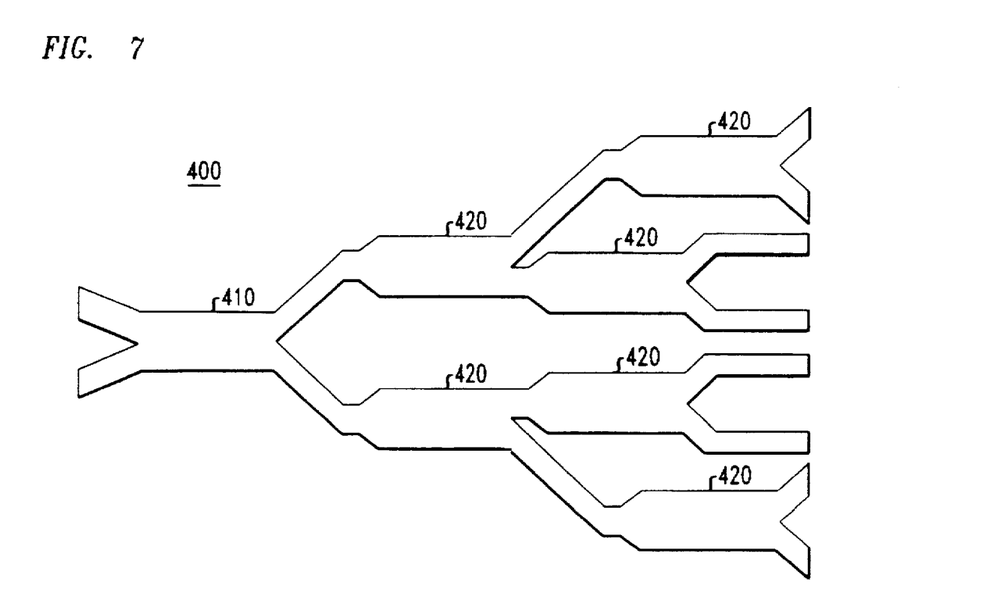
FIG. 7 illustrates a top view of an exemplary 2×8 silica optical switch in accordance with the invention employing waveguide structures of FIGS. 1, 2 and 4.

It is possible to use acousto-optic switches in accordance with the invention as individual 1×2 or 2×2 optical switches or as elements in various array configurations to produce N×M optical switches, wherein N and M are positive integers. A waveguide structure 400 for an exemplary 2×8 optical routing switch according to the invention is shown in FIG. 7. The depicted waveguide structure 400 is formed by an array of 2×2 and 1×2 switch elements 410 and 420. It is possible to connect the respective previously described waveguide structures 15 and 300 of FIGS. 2 and 6 to provide the switch elements 410 and 420 of the structure 400. The required separation angles between the output sections of the depicted switch elements 410 and 420 have not been drawn to scale for ease of illustration. Further, it should be readily understood that respective SAW sources would be required to perform the desired switching functions of the respective elements 410 and 420. In operation, it is possible to disconnect or connect RF excitation to the respective SAW sources to route a signal form one of the two input sections to a desired output section in the waveguide structure 400.

Although the switch configurations of FIGS. 1, 2, 6 and 7, have been described with respect to a substantially complete transfer of power from the first transmission mode to the second transmission mode to route such optical signal power to either the first or second output sections, it is alternatively possible to set the multimode section interaction length L or SAW source RF excitation power to split or apportion desirable amounts of the optical signal power to the respective output sections. Thus, with such a configuration, it is possible to route a particular X%, such as 50%, of the such optical signal power to the first output section and Y%=(100%−X%) of the signal power to the second output section if RF excitation is provided to the SAW source.

Although several embodiments of the invention have been described in detail above, many modifications can be made without departing from the teaching thereof. All of such modifications are intended to be encompassed within the following claims. For example, although the switch elements 410 and 420 are formed within a single common integrated optical circuit in FIG. 6, it is alternatively possible to form such switch elements within one or more integrated optical circuits that are optically coupled to one another. Moreover, in like manner, the switch waveguide structure 400 of FIG. 7, as well as structures 15 and 300 of FIGS. 1 and 2, and 6, can advantageously be formed within a integrated optical circuit containing other devices forming a desired integrated optical signal processing structure having compact dimensions.

The invention claimed is:

1. A silica optical circuit switch comprising:
    a planar waveguide structure formed within silica glass, said waveguide structure having a first input section connected to a multimode waveguide section connected to first and second output sections;
    said input and output sections being single mode sections, said multimode section having a structure capable of propagating an optical signal in a first transmission mode and/or a second transmission mode, said first output section having a structure capable of accepting power from an optical signal propagating in said first transmission mode in said multimode section, and said second output section having a structure capable of accepting power from an optical signal propagating in said second transmission mode in said multimode section; and
    a controllable surface acoustic wave (SAW) source positioned relative to said waveguide structure to selectively direct a surface acoustic wave at a particular phase matching angle relative to said multimode section for coupling power of an optical signal between said first and second transmission modes in said multimode section.

2. The switch of claim 1 further comprising an acoustic energy damper formed on a silica optical circuit containing said waveguide structure, said damper for reducing acoustic wave energy that propagates through said waveguide structure at angles other than said phase matching angle.

3. The switch of claim 2 wherein said damper comprises an acoustic energy absorbing material disposed in a trench within said silica optical circuit.

4. The switch of claim 3 wherein said trench containing epoxy extends to a depth within said silica optical circuit that includes said waveguide structure.

5. The switch of claim 3 wherein said energy absorbing material is epoxy.

6. The switch of claim 3 wherein said waveguide structure is located between said damper and said SAW source.

7. The switch of claim 2 wherein damper includes acoustic energy absorbing material disposed on at least one surface of said integrated optical circuit.

8. The switch of claim 7 wherein said energy absorbing material is disposed on at least one edge surface of said integrated optical circuit.

9. The switch of claim 7 wherein said energy absorbing material is epoxy.

10. The switch of claim 1 wherein said SAW source is located on a surface of a silica optical circuit containing said waveguide structure, said SAW source further producing said surface acoustic wave having a frequency corresponding to a phase matching condition between said first and second transmission modes of said multimode section.

11. The switch of claim 1 wherein said acoustic frequency is in the range of approximately 25 MHz to 1.0 GHz.

12. The switch of claim 1 wherein said SAW source is an interdigital transducer formed on a surface of a silica optical circuit containing said waveguide structure.

13. The switch of claim 1 wherein said multimode waveguide structure has a length between approximately 0.5 and 5 cm.

14. The switch of claim 1 wherein said multimode waveguide structure has a length capable of directing a portion of power of an optical signal to said second output waveguide section if RF excitation is provided to said SAW source.

15. The switch of claim 1 wherein said first and second transmission modes are even and next higher, odd transmission modes, respectively.

16. The switch of claim 1 wherein said first and second output waveguides have a relative separation angle extending from said multimode section of no greater than approximately 1.5°.

17. The switch of claim 1 wherein said first and second output waveguides have a relative separation angle extending from said multimode section in the range of approximately 0.2° to 1.0°.

18. The switch of claim 1 wherein said first and second output waveguides have respective cross-sectional areas and/or relative refractive indexes that differ by no less than approximately 20%.

19. The switch of claim 18 wherein said first and second output waveguides have respective cross-sectional areas and/or relative refractive indexes that differ by no less than approximately 50%.

20. The switch of claim 1 wherein said waveguide structure further comprises a second input section connected to said multimode section.

21. The switch of claim 20 wherein said second input section has a structure which is capable of propagating an optical signal into the multimode section in said second transmission mode.

22. The switch of claim 1 wherein said waveguide structure is adiabatically tapered between said first input section and said multimode section.

23. A N×M switch comprising an array of optically connected switches as is claimed in claim 1.

* * * * *